United States Patent
Schoenmeyr

Patent Number: 5,803,711
Date of Patent: Sep. 8, 1998

[54] CONTROL CIRCUIT FOR SOLENOID VALVE

[76] Inventor: Ivar Schoenmeyr, 27126 Cipres, Mission Viejo, Calif. 92692

[21] Appl. No.: 595,474

[22] Filed: Feb. 5, 1996

Related U.S. Application Data

[62] Division of Ser. No. 22,724, Feb. 24, 1993, Pat. No. 5,632,468.

[51] Int. Cl.$^6$ ................................................. F04B 49/00
[52] U.S. Cl. ........................................ 417/36; 251/129.09
[58] Field of Search ................. 417/36, 28; 251/129.15, 251/129.09

[56] References Cited

U.S. PATENT DOCUMENTS

| | | | |
|---|---|---|---|
| 1,979,127 | 10/1934 | Warrick | 251/129.09 |
| 3,391,547 | 7/1968 | Kingston | 137/392 |
| 3,410,301 | 11/1968 | Merriner et al. | 251/30.02 |
| 3,419,034 | 12/1968 | Hart | 137/392 |
| 3,477,460 | 11/1969 | Dotto | 137/392 |
| 3,509,825 | 5/1970 | Sorensen | 137/392 |
| 3,547,154 | 12/1970 | Benham | 251/129.15 |
| 3,751,185 | 8/1973 | Gottliebson | 417/36 |
| 3,789,876 | 2/1974 | Kempton et al. | 251/129.15 |
| 3,916,213 | 10/1975 | Luteran | 137/392 |
| 3,916,926 | 11/1975 | Smolin et al. | 137/392 |
| 3,921,670 | 11/1975 | Clippard, Jr. et al. | 251/129.15 |
| 3,957,395 | 5/1976 | Ensign | 417/28 |
| 4,074,700 | 2/1978 | Engle | 251/129.15 |
| 4,259,982 | 4/1981 | Bartels | 137/392 |
| 4,560,323 | 12/1985 | Orchard | 417/28 |
| 4,600,844 | 7/1986 | Atkins | 417/36 |
| 4,635,683 | 1/1987 | Nielsen | 251/129.18 |
| 4,679,766 | 7/1987 | Cuming | 251/129.15 |
| 4,787,414 | 11/1988 | Kelly et al. | 251/129.15 |
| 4,799,864 | 1/1989 | Hockley | 417/36 |
| 4,886,114 | 12/1989 | Perkins et al. | 251/129.07 |
| 4,974,622 | 12/1990 | Rader | 251/129.15 |
| 4,976,850 | 12/1990 | Kulitz | 417/36 |
| 4,981,173 | 1/1991 | Perkins et al. | 251/129.09 |
| 5,145,323 | 9/1992 | Farr | . |
| 5,147,559 | 9/1992 | Brophy et al. | 417/26 |
| 5,168,893 | 12/1992 | Benson | 417/28 |
| 5,293,551 | 3/1994 | Perkins et al. | 251/129.15 |

Primary Examiner—Timothy Thorpe
Assistant Examiner—Peter G. Korytnyk
Attorney, Agent, or Firm—Blakely Sokoloff Taylor & Zafman

[57] ABSTRACT

A solenoid valve for a water purification system. The solenoid valve contains a fluid valve which can move between an opened position and a closed position, and a coil which moves the valve to the open position when a first voltage is supplied to the coil and maintains the valve in the open position as a second voltage is supplied to the coil. The coil is coupled to a control circuit which initially supplies the first voltage to the coil when the valve is to be opened, and then reduces the first voltage to the second voltage after the valve is in the open position.

15 Claims, 2 Drawing Sheets

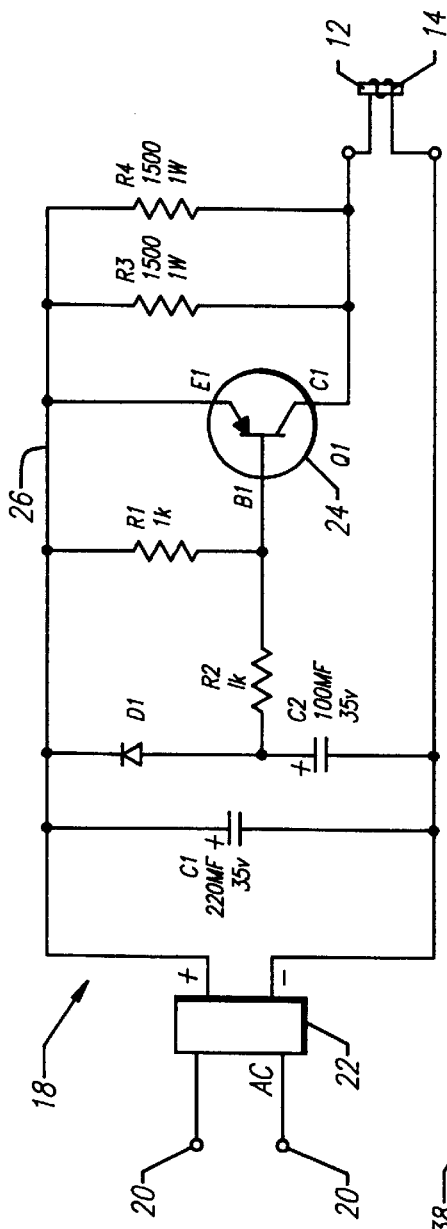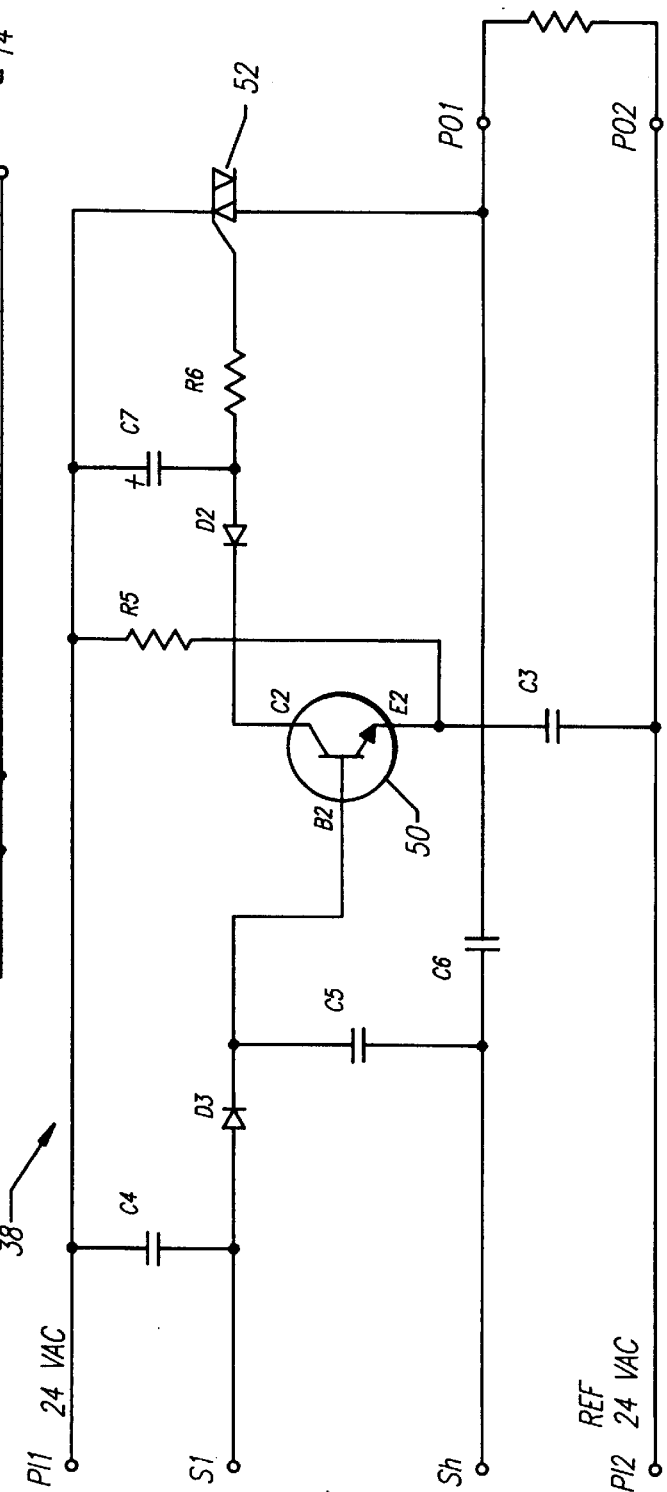
FIG. 1
FIG. 5

CONTROL CIRCUIT FOR SOLENOID VALVE

This is a divisional of application Ser. No. 08/022,724, filed Feb. 24, 1993, now U.S. Pat. No. 5,632,468, issued May 27, 1997.

BACKGROUND OF THE INVENTION

1. Field of the Invention

The present invention relates to a solenoid valve for a water purification system.

2. Description of Related Art

Water purification systems typically include a pump that pumps contaminated water through a filter unit. The filter may contain a reverse osmosis membrane which removes impurities in the water. The water is then stored within a tank and subsequently removed by the end user. Water purification systems range in size from large industrial units to smaller systems that can be installed under the sink of a home.

Residential water purification units typically have a valve that controls the flow of water between the pump and a municipal water source. To more fully automate the purification unit, the valves may contain solenoids which are controlled by a control circuit. The valves typically move into an open position when the control circuit provides power to the solenoid. Most solenoid operated valves require a relatively large amount of current to move the valves from the closed position to the open position. The large current is typically needed to overcome the fluid back pressure exerted on the valve, and the internal air gap within the valve and flux gap. Once the valve is opened, the solenoid does not require the large initial current needed to open the valve. The continual supply of excessive power to the valve, may overheat the solenoid and draw in an unnecessary amount of power. The heat may cause the solenoid to fail, thereby reducing the life and reliability of the valve unit. Additionally, the excessive use of power creates a valve that is costly to operate.

The control circuit of the valve is typically powered by the same transformer that powers the motor of the pump. When the pump is turned on, the motor requires a gradually increasing amount of current to correlate with the increasing speed of the pump unit and the back pressure that is generated by the pump. In a typical water purification system, the solenoid valve and pump unit are activated simultaneously, so that municipal water is pumped to the filter unit. The transformer must pull in an increasing amount of power during the initial state of the pumping cycle to accommodate the constant current requirement of the solenoid valve and the ramping current requirement of the pump motor. The transformer must therefore be built to accommodate the maximum current requirements of both devices. It would be desirable to have a solenoid valve which only requires an initial large current to open the valve and then draws a lower amount of current to maintain the valve in the open position. It would also be desirable to have a solenoid valve that has a decreasing current load requirement that matches the increasing load requirement of the pump motor, so that the power provided by the transformer is approximately a constant value during the entire pumping cycle of the system. Residential water purification systems typically have used an AC powered solenoid valve that is driven by the same transformer that supplies power to the systems other electric al components.

AC powered transformers becomes objectionably noisy if the armature is not in full contact with the core of the solenoid. The noise is created by the variable field strength form the alternating current rocking the armature. It would therefore be desirable to have a control circuit that eliminates the risk of noise by providing a DC holding current.

SUMMARY OF THE INVENTION

The present invention is a solenoid valve for a water purification system. The solenoid valve contains a fluid valve which can move between an opened position and a closed position, and a coil which moves the valve to the opened position when a first voltage is supplied to the coil and maintains the valve in the open position as a second voltage is supplied to the coil. The coil is coupled to a control circuit which initially supplies the first voltage to the coil when the valve is to be opened, and then reduces the first voltage to the second voltage after the valve is in the open position.

The valve control circuit may be connected to a tank control circuit, which is coupled to a transformer and a water level sensor within a storage tank. The storage tank is connected to a reverse osmosis membrane that purifies water that is pumped through the system by a pump unit. The tank control circuit is constructed to provide power from the transformer to the pump and solenoid valve when the water within the tank reaches a first level, and terminate power to the pump and valve when the water within the tank rises to a second level. The tank control circuit includes a latching scheme which prevents oscillation of the power switches about the first and second levels of the tank.

The solenoid valve has a gradually decreasing current load which preferably matches a gradually increasing current load of the pump unit, so that the transformer provides an approximately constant level of power during the entire pumping cycle of the system.

Therefore, it is an object of the present invention to provide a solenoid valve which initially opens with a first voltage and is maintained in the open position by a lower second voltage.

It is also an object of the present invention to provide a water purification system that draws an approximately constant level of power during the entire pumping cycle.

It is also an object of the present invention to provide a solenoid valve that is energy efficient and does not dissipate a large amount of heat.

It is also an object of the present invention to provide a control circuit that can control power to both a pump and a solenoid valve.

It is also an object of the present invention to provide a control circuit that eliminates the possibility of noise and vibration from the solenoid valve.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a schematic of a solenoid valve circuit of the present invention;

FIG. 5 is a schematic of the tank control circuit of FIG. 2.

DETAILED DESCRIPTION OF THE INVENTION

Figure 6:
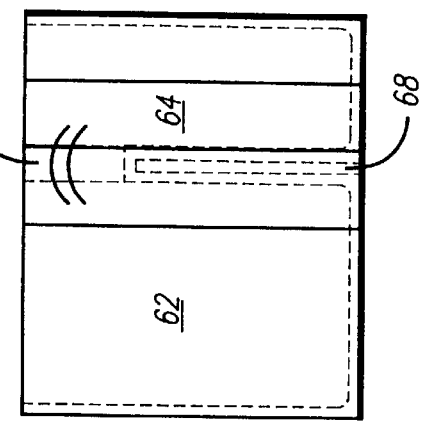
FIG. 6 is a side view of a housing for the solenoid valve.

Referring to the drawings more particularly by reference numbers, FIG. 1 shows a circuit for a solenoid valve 10 of the present invention. The solenoid valve 10 typically has a fluid valve 12 coupled to a coil 14. The valve 12 is adapted to move between an open position and a closed position. The valve moves from the closed position to the open position when a voltage is applied to the coil 14. The solenoid valve may also have a spring that biases the valve to the closed position.

The coil 14 is connected to the output pins 16 of a valve control circuit 18 which controls the power supplied to the coil 14. The control circuit 18 also has a pair of input pins 20 that are typically connected to a source of AC power. The AC power is rectified to DC power by rectifier 22.

The control circuit 18 has a pnp transistor 24 that has an emitter E1 connected to a power supply line 26 and a collector C1 coupled to the coil 14. The emitter E1 is in parallel with resistor R1. The collector C1 is coupled to resistor R2. The resistors R1 and R2 are both connected to the base B1 of the transistor 24. The transistor 24 is also in parallel with resistors R3 and R4 which are both connected to the power supply line 26 and the coil 14.

The control circuit 18 may have a first capacitor C1 which is in parallel with the rectifier 22. The circuit also has a second capacitor C2 which is coupled to the base B1 of the transistor 24. Between the second capacitor C2 and the power supply line 26 is a diode D1.

In operation, the AC voltage source supplies a source voltage which is rectified and provided to the control circuit 18 as a DC voltage Vr. The current from the power source initially flows through the pnp transistor 24, which is operating above the saturation point of the device 24. The current flow through the transistor provides a first voltage V1 at the coil 14 that is approximately equal to the rectified source voltage Vr. The application of the first voltage V1 to the coil 14 moves the fluid valve 12 into the open position. The first voltage V1 is typically great enough to overcome any resistive forces on the valve 12. For example, the torque created by the coil 14 is typically greater than the fluid back pressure that is exerted on the fluid valve 12. As power is applied to the coil, the second capacitor C2 is drawing current and being charged. The flow of current to the second capacitor C2 maintains the biasing current B1 below the transition level of the transistor, so that the pnp transistor stays on while the second capacitor C2 is being charged.

Figure 2:
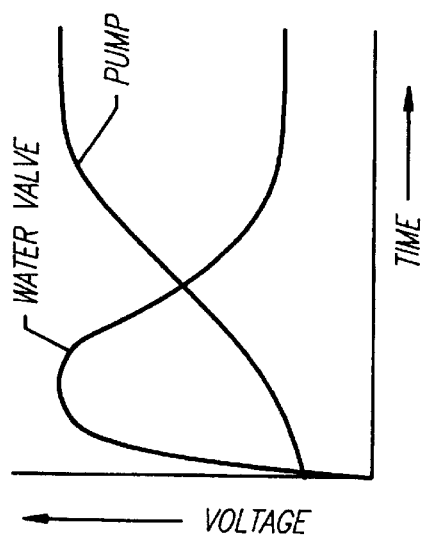
FIG. 2 is a graph showing the output voltage of a valve control circuit as a function of time.

As the second capacitor C2 charges up, more current flows into the base B1, thereby reducing the current that flows across the transistor 24 and into the coil 14. When the second capacitor C2 becomes completely charged, the capacitor C2 becomes an open circuit to the DC power supplied from the rectifier 22. When the capacitor C2 reaches the fully charged state, the current at the base B1 reaches a level that turns the transistor off. The rectified source voltage Vr is then applied across the resistors R3 and R4. The resistors R3 and R4 are typically an order of magnitude larger than the resistive value of R1. As shown by the graph in FIG. 2, the resistors R3 and R4 reduce the voltage applied to the coil 14 to a second voltage level V2. The second voltage V2 is large enough to maintain the fluid valve 12 in the open position.

Figure 3:
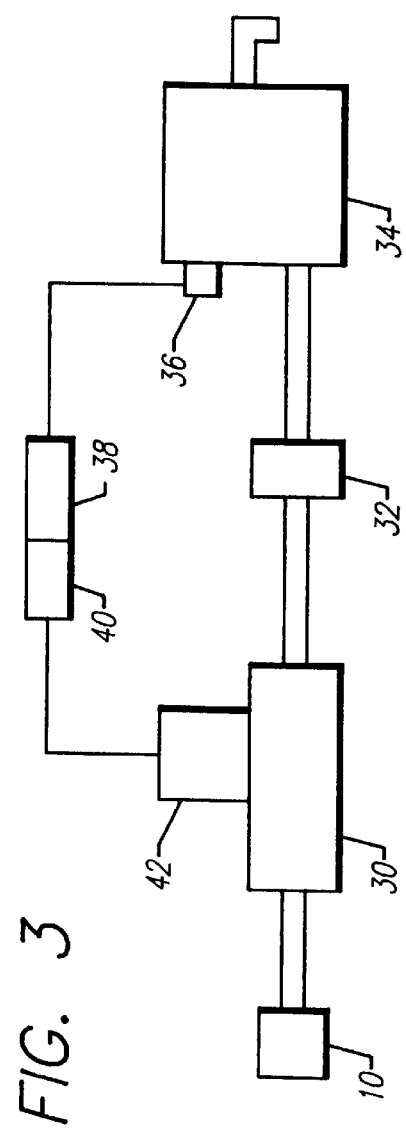
FIG. 3 is a schematic of the solenoid valve of FIG. 1 in a water purification system.

As shown in FIG. 3, the solenoid valve 10 may be used in a water purification system. The purification system has a pump 30 which pumps water through a reverse osmosis membrane or filter 32 from an external source of water. The purified water is typically stored in a storage tank 34. The storage tank 34 contains a sensor system 36 that senses when the water within the storage tank 34 reaches a first predetermined level and a second predetermined level. The sensor system 36 may include floating contacts, pressure transducers or any other means for sensing the level of water within the tank.

The tank sensors 36 are connected to a tank control circuit 38. The tank control circuit 38 is connected to a transformer 40 and a motor 42 that drives the pump 30. The tank control circuit 38 functions as a switch between the transformer 40, and the solenoid valve 10 and motor 42. The control circuit 38 is constructed so that power is supplied to the motor 42 and valve 10 when the tank water is at the first level, and power is not supplied to the motor 42 and valve 10 when the tank water level is at the second level.

In operation, the tank control circuit 38 supplies power to the solenoid valve 10 and motor 42 to open the valve 10 and drive the pump 30, respectively. Water is pumped through the membrane until the water within the storage tank reaches the second predetermined level. The tank control circuit 38 then terminates the power to the motor 42 and solenoid valve 10, respectively.

Figure 4:
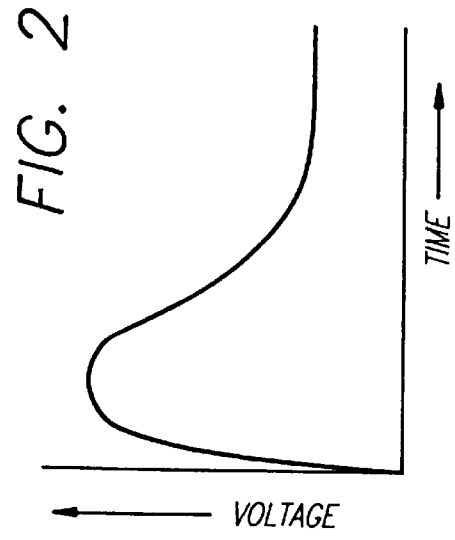
FIG. 4 is a graph showing the current load requirements of a pump motor and solenoid valve of the water purification system of FIG. 3.

As shown by the graph in FIG. 4, the capacitors and resistors of the valve 10 control circuit 38 are typically selected so that the decreasing current requirements of the solenoid valve 10 correspond to the increasing current requirements of the pump 30. This matching current requirement produces a purification system which draws a relatively constant supply of power through the transformer during the entire water pumping cycle of the system.

FIG. 5 shows a preferred embodiment of the tank control circuit 38. The circuit 38 has output pins PO1 and PO2 connected to the solenoid valve 10 and motor 42, and power input pins PI1 and PI2 connected to the output of the transformer 40. The circuit 38 also has sensor pins S1 and Sh that are connected to the sensor system 36 of the storage tank 34.

The control circuit 38 contains a npn transistor 50 which has an emitter E2 connected to a power supply line of the transformer output through resistor R5 and to a transformer reference line through capacitor C3, a collector C2 that is coupled to the gate of a triac 52 through diode D2 and resistor R6, and a base B2 that is connected to the power supply line through capacitor C4 and diode D3, and also coupled to a first node of the triac 52 through capacitors C5 and C6. The circuit 38 also contains capacitor C7 which is coupled to the gate of the triac 52.

In operation, when the water within the storage tank falls to the first level, the sense pin S1 becomes coupled to the transformer 40, so that the transistor biasing current flows through capacitor C4. The biasing current switches the transistor 50 so that current flows through resistor R6 and into the gate of the triac 52. The triac 52 is then biased so that current can flow through the device 52 and into the motor 42 and solenoid valve 10. The capacitor C7 provides energy to the gate of the triac 52 during the negative half cycle of the AC power.

The current from the triac 52 also flows back into the base B2, so that a biasing current is maintained at the transistor 50, even when the sense pin S1 becomes decoupled from the transformer 40 and current no longer flows through capacitor C4. This latching scheme allows the pump 30 to continue pumping even when the water rises above the first predetermined level in the tank 34. Such a system prevents power oscillation about the first water level.

Power is supplied to the motor 42 and valve 10 until the water level within the storage tank 34 reaches the second level, at which point the sense pin Sh is coupled to ground. The output of the triac 52 also becomes coupled to ground, which drains the biasing current and turns off the transistor 50. Turning off the transistor 50 eliminates the biasing current to the triac 52, which turns the triac 52 off and terminates power to the motor 42 and solenoid 10.

FIG. 6 shows a preferred embodiment of a solenoid valve unit enclosed by a housing 60 that has a first compartment 62 and a second compartment 64. The first compartment 62 typically contains the fluid valve 12 and coil 14 of the solenoid valve unit. The second compartment 64 typically contains the control circuit 38 for the valve unit. The housing 60 has a passage 66 which allows wires to connect the coil 14 in the first compartment 62 to the control circuit 18 in the second compartment 64. The compartments are separated by an air channel 68. The air channel 68 is typically thin, so that the mode of heat transfer between the compartments 62 and 64 is primarily through conduction. The air channel 68 provides an insulative barrier between the compartments, so that the heat dissipation of the coil 14 is not readily transferred to the control circuit 18.

What is thus provided is a energy efficient solenoid valve 10 which can be used to control the flow of water into the pump 30 of a water purification system so that a relatively constant supply of power is pulled by the system during a water purification cycle.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A water purification system coupled to a source of water, comprising:
   a filter unit;
   a pump connected to said filter unit;
   a solenoid valve comprising a fluid valve and a coil, connected to said pump and the source of water, said coil being adapted to move said fluid valve from a closed position to an open position when a first voltage is supplied to said coil, and maintains said fluid valve in said open position when a second voltage is supplied to said coil, wherein said first voltage is greater than said second voltage; and,
   a valve circuit that initially supplies said first voltage to said coil to move said fluid valve to said open position and then subsequently supplies said second voltage to said coil to maintain said fluid valve in said open position, said second voltage being supplied to said coil a predetermined time interval after application of said first voltage to said coil.

2. The system as recited in claim 1, further comprising a motor operatively connected to said pump and a transformer that supplies a transformer voltage to said motor and said valve circuit means.

3. The system as recited in claim 1, further comprising a storage tank connected to said filter unit, and sensing means for sensing when water within said storage tank reaches a first predetermined level and a second predetermined level.

4. The system as recited in claim 3, further comprising tank circuit means for supplying a source voltage to said solenoid valve when water reaches said first predetermined level within said storage tank and terminating said source voltage when the water reaches said second predetermined level within said storage tank.

5. The system as recited in claim 4, wherein said tank circuit means includes latching means for supplying said source voltage when the water reaches said first predetermined level and maintaining said source voltage until the water reaches said second predetermined level.

6. The system as recited in claim 5, wherein said tank circuit means includes;
   a transistor having a biasing gate coupled to a transformer power line, an emitter connected to said transformer power line and ground, and a collector;
   a first level contact that is coupled to said biasing gate when water within said storage tank is at said first predetermined level;
   a second level contact that is coupled to said biasing gate when water within said storage tank is at said second predetermined level; and,
   a triac having a first node connected to said transformer power line, and a second node coupled to said base of said transistor and connected to said valve circuit means and said motor, said triac further having a gate connected to said collector of said transistor.

7. The solenoid valve as recited in claim 1, wherein said valve circuit means includes;
   voltage input means for receiving a source voltage;
   voltage output means for providing said first and second voltages to said solenoid valve;
   voltage reduction means for reducing said first voltage to said second voltage;
   switch means for coupling said voltage reduction means to said voltage input means after said first voltage has been supplied to said solenoid valve a first time interval.

8. The solenoid valve as recited in claim 7, wherein said switch means includes a transistor operatively coupled to said voltage reduction means, and a capacitor operatively connected to said voltage input means and a biasing gate of said transistor.

9. The solenoid valve as recited in claim 8, wherein said voltage input means provides a DC source voltage to said capacitor and said transistor.

10. The solenoid valve as recited in claim 7, wherein said circuit means includes;
    rectifier means for rectifying said source voltage;
    a pnp transistor having a base, an emitter connected to said rectifier means and a collector connected said coil means;
    a resistor circuit connected to said rectifier means and said solenoid valve in parallel with said emitter and said collector of said transistor; and,
    a capacitor operatively connected to said rectifier means and said base of said transistor.

11. The solenoid valve as recited in claim 1, further comprising a housing that has a first compartment separated from a second compartment by an air channel, wherein said first compartment contains said fluid valve and coil, and said second compartment contains said circuit valve means.

12. A water purification system coupled to a source of water, comprising;
    a storage tank;
    sensor means operatively connected to said storage tank for sensing when water reaches a first predetermined level and a second predetermined level within said storage tank;

a filter unit connected to said storage tank;

a pump connected to said filter unit;

a motor operatively connected to said pump;

a transformer operatively connected to said motor;

a solenoid valve comprising a fluid valve and a coil, connected to said pump and the source of water, said coil being adapted to move said fluid valve from a closed position to an open position when a first voltage is supplied to said coil, and maintains said fluid valve in said open position when a second voltage is supplied to said coil, wherein said first voltage is greater than said second voltage;

a valve circuit that initially supplies said first voltage to said coil to move said fluid valve to said open position and then subsequently supplies said second voltage to said coil to maintain said fluid valve in said open position, said second voltage being supplied to said coil a predetermined time interval after application of said first voltage to said coil; and, a tank circuit connected to said transformer that provides said motor and said valve circuit with a source voltage when the water within said storage tank reaches said first predetermined level, and that terminates said source voltage when the water within said storage tank reaches said second predetermined level.

13. The solenoid valve as recited in claim 12, wherein said valve circuit means includes;

voltage input means for receiving said source voltage from said tank circuit coil means;

voltage output means for providing said first and second voltages to said solenoid valve;

voltage reduction means for reducing said source voltage to said second voltage;

switch means for operatively coupling said voltage reduction means to said voltage input means after said first voltage has been supplied to said solenoid valve a first time interval.

14. The solenoid valve as recited in claim 13, wherein said valve circuit means includes;

rectifier means for rectifying said source voltage;

a pnp transistor having a base, an emitter connected to said and a collector connected said coil means;

a resistor circuit connected to said and said solenoid valve in parallel with said transistor; and, a capacitor operatively connected to said rectifier means and said base of said emitter and said collector of said transistor.

15. The system as recited in claim 14, wherein said tank circuit means includes;

a transistor having a biasing gate coupled to a transformer power line, an emitter connected to said transformer power line and ground, and a collector;

a first level contact that is coupled to said biasing gate when water within said storage tank is at said first predetermined level;

a second level contact that is coupled to said tank biasing gate when water within said storage tank is at said second predetermined level; and, a triac having a first node connected to said transformer power line, and a second node connected to said valve circuit means and said motor, said triac further having a gate connected to said collector of said transistor.

* * * * *